June 29, 1965  B. D. SCHWALM  3,191,373
FORAGE HARVESTER
Filed Sept. 10, 1963
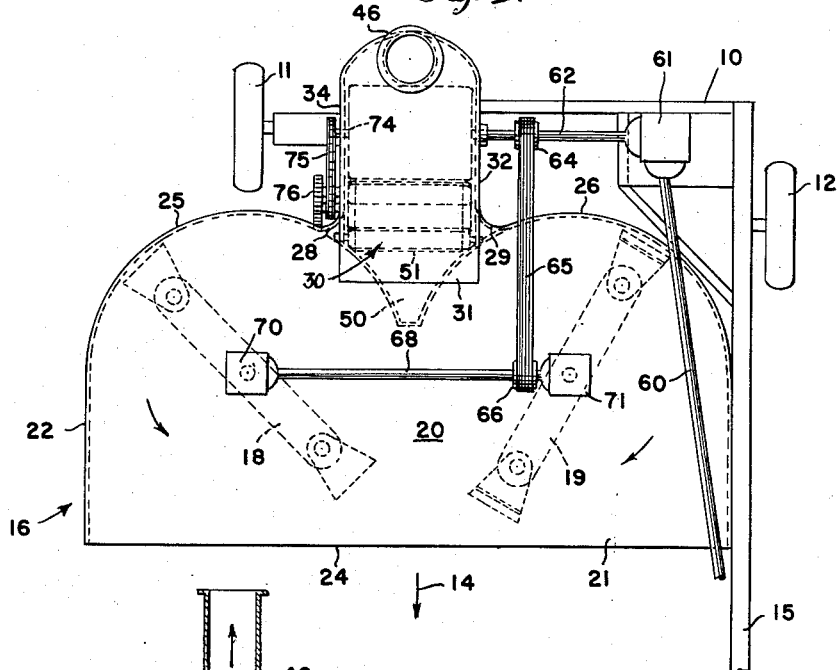
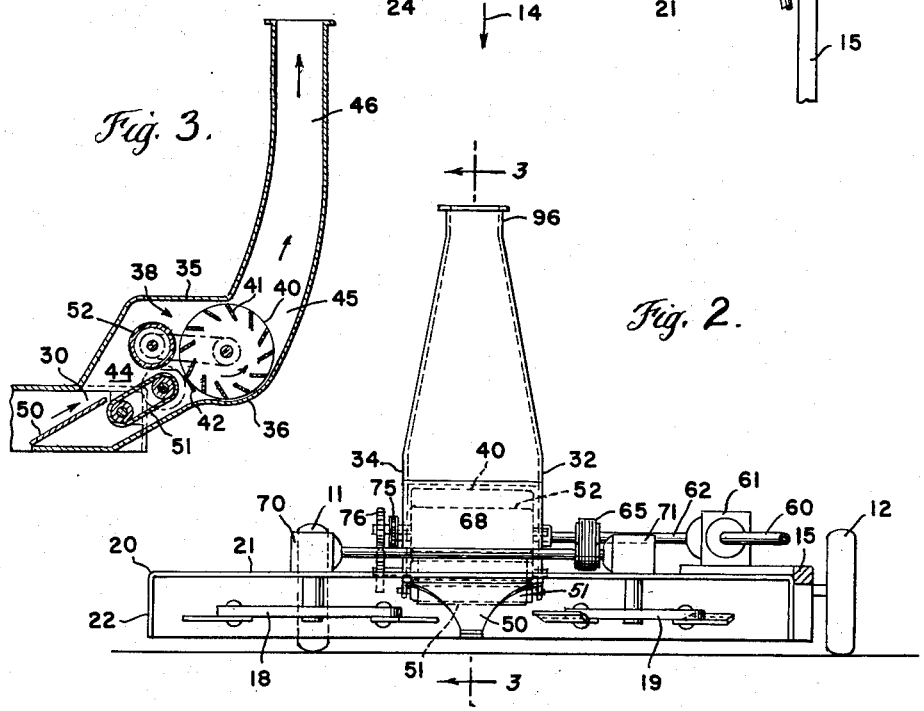
INVENTOR.
BRUCE D. SCHWALM
BY
ATTORNEY

United States Patent Office 3,191,373
Patented June 29, 1965

3,191,373
FORAGE HARVESTER
Bruce D. Schwalm, Leola, Pa., assignor to Sperry Rand Corporation, New Holland, Pa., a corporation of Delaware
Filed Sept. 10, 1963, Ser. No. 307,910
3 Claims. (Cl. 56—504)

This invention relates generally to forage harvesters and more particularly to a machine for harvesting standing crop material other than row crops.

One object of this invention is to provide a forage harvester which first cuts standing material into relatively long lengths and then conveys such material lengthwise to a chopper which will cut the material into pieces of relatively small uniform size.

Another object of this invention is to provide a forage harvester of the character described which will first cut a very wide swath of material and then laterally consolidate it for rearward conveyance to a chopper.

A further object of this invention is to provide a forage harvester in which the initial cutting and consolidating of material is achieved by a simple mechanism both in operative components and in the drive means employed.

Other objects of this invention will be apparent hereinafter from the specification and from the recital in the appended claims.

In the drawing:
FIG. 1 is a generally diagrammatic plan view of a forage harvester constructed according to this invention;
FIG. 2 is a front view of FIG. 1; and
FIG. 3 is a longitudinal vertical section taken on line 3—3 of FIG. 2 looking in the direction of the arrows.

Referring now to the drawings by numerals of reference, 10 denotes a frame supported by ground wheels 11 and 12. The frame is adapted to be towed in a forward direction, indicated by the arrow 14, by means of a tongue 15 connectable to the drawbar of a tractor.

Mounted on frame 10 at a forward portion thereof is a rotary cutter unit 16 comprising a pair of rotary cutters 18 and 19 rotatable side by side about vertical axes. These cutters are supported on a hood 20 having a top wall 21 and depending side walls 22. The forward portions of side walls 22 are parallel, and the parallel portions define a forwardly directed inlet opening at 24 which extends transversely substantially the full width of the machine. At the rearward end of hood 20, curved walls 25 and 26 are provided and concentric with the axes of rotation of the rotary cutters 18 and 19, respectively. Wall 25 terminates at 28 and wall 26 terminates at 29 to define a discharge outlet 30.

Supported on frame 10 rearwardly of the hood 20 and along the longitudinal plane of symmetry of the machine is a housing 31 having fore-and-aft extending vertical side walls 32 and 34, a top wall 35 and a bottom wall 36. The side walls 32 and 34 rotatably support a reel type chopper 38 comprising a cutterhead 40 rotatable on a transverse axis and having angularly spaced knives 41 rotatable in a counterclockwise direction when viewed as shown in FIG. 3 for successive cooperation with a stationary shear bar 42. The top, bottom and side walls of housing 31 define an infeed opening 44 to receive crop material from the discharge outlet 30 of the hood 20. Material cut by the chopper 38 is discharged through a housing opening 45 which communicates with a vertical discharge spout 46.

Interposed between rotary cutter unit 16 and the reel type chopper 38 is guide means comprising an inclined guide plate 50 having a forward lower end adjacent the ground and a higher upper rearward end facing the infeed opening 44 of housing 31. Material coming from the rotary cutters 18 and 19 travels up the inclined guide plate 50 and is deposited on a feed apron 51 the upper rearward end of which is above and adjacent shear bar 42. Above the apron is a feed roll 52 which compresses the crop material before it enters the path of travel of the knives 41 of the chopper.

For driving the mechanism, a power-take-off shaft 60 is provided which extends fore-and-aft, terminating in a rearwardly located gearbox 61 mounted on frame 10. The gearbox has a transversely extending output shaft 62 which drives the cutterhead 40 of the chopper. Along the length of shaft 62 a sheave 64 is provided which drives belts 65 to a sheave 66 on a transversely extending shaft 68 extending above hood 20. One end of shaft 68 is connected to a gearbox 70 for driving rotary cutter 18 and the opposite end of the shaft is connected to a gearbox 71 to the rotary cutter 19. The drive is such that the cutter 18 rotates in a counterclockwise direction when viewed from above as shown in FIG. 1 while the cutter 19 rotates in a clockwise direction. Both cutters discharge material rearwardly in long lengths and through the medially located center outlet 30 in hood 20.

The axial end of rotary chopper 38 remote from shaft 62 has an output shaft 74 which operates through a chain 75 to drive the feed roll 52. Power is taken from the feed roll through gearing 76 to drive the infeed apron 51.

With this design, the swath of material covered by the rotary cutters 18 and 19 is very wide and a large volume of cut material is delivered to the chopper 38. The respective rotary cutters deliver material of substantial length, with the material extending lengthwise as it travels up the inclined plate 50 and into the chopper. The chopper then operates to cut the material into relatively short pieces of uniform size for discharge through the spout 46 to a trailing wagon.

The overall design provides a simple harvester construction with a large capacity and uniform, fine length of cut. The drive train is relatively simple and the initial cutting and gathering of the crop is handled by a minimum amount of structure and mechanism.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:
1. A double cut forage harvester comprising, in combination, a wheel supported frame adapted for ground travel in a forward direction, a hood on said frame having a generally horizontally extending top wall and vertically extending walls depending therefrom, said vertically extending walls having parallel portions, said walls defining a forwardly located inlet across the front of the hood for standing crop material and a center rearwardly located discharge outlet, a pair of rotary cutters located side by side within said hood and supported on said top wall for rotation about laterally spaced vertical axes, said horizontal top wall being uninterrupted through its horizontal extent and covering said rotary cutters, power means rotating one of said cutters in one direction and the other cutter in an opposite direction, both cutters cooperating to cut a swath of material substantially the distance between said parallel portions and discharging the material rearwardly toward said center outlet, a housing having laterally spaced side walls, a top wall and a bottom wall providing a discharge opening facing rearwardly and defining an infeed opening facing forwardly in register with said hood outlet, a reel type chopper within said housing and supported on said side walls, said chopper being rotatable on a horizontal transverse axis, a transverse shear bar on said housing and over which material passes on entering the housing through said infeed opening, said chopper having angularly spaced knives successively cooperative with said shear bar, guide means mounted on said frame in front of said housing opening to receive material discharged from said pair of rotary cutters and to direct the material to said chopper, and a rearwardly located spout on said housing in communication with said discharge opening and through which material passes that has been cut first by said pair of cutters and then by said chopper.

2. A double cut forage harvester as recited in claim 1 wherein said guide means comprises a guide plate inclined downwardly and forwardly from an upper end toward said housing infeed opening to a lower end beneath said hood at said center outlet, and an infeed apron between said plate upper end and said housing.

3. A double cut forage harvester as recited in claim 1 wherein said chopper is driven by a transverse drive shaft coaxial therewith, said power means for said pair of cutters being driven by a connection to said drive shaft.

References Cited by the Examiner
UNITED STATES PATENTS

| | | | |
|---|---|---|---|
| 2,071,872 | 2/37 | Cockburn | 56—25.4 |
| 2,634,569 | 4/53 | Raney et al. | 56—16 |
| 2,843,991 | 7/58 | Poehls | 56—23 |
| 2,849,851 | 9/58 | Hayter | 56—157 |
| 2,857,946 | 10/58 | Nikkel | 56—1 |
| 2,972,848 | 2/61 | McKee | 56—16 |
| 3,157,014 | 11/64 | Bottenberg | 56—6 |

ABRAHAM G. STONE, *Primary Examiner.*

ANTONIO F. GUIDA, T. GRAHAM CRAVER,
*Examiner.*